(12) United States Patent
Ideguchi et al.

(10) Patent No.: US 10,841,394 B2
(45) Date of Patent: Nov. 17, 2020

(54) SERVER FOR CACHING SESSION INFORMATION SET AND METHOD OF CONTROLLING CACHE OF SESSION INFORMATION SET

(71) Applicant: Hitachi, Ltd., Tokyo (JP)

(72) Inventors: Kota Ideguchi, Tokyo (JP); Nobuyoshi Morita, Tokyo (JP); Kota Seki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/285,586

(22) Filed: Feb. 26, 2019

(65) Prior Publication Data

US 2019/0273803 A1  Sep. 5, 2019

(30) Foreign Application Priority Data

Mar. 5, 2018 (JP) .................................. 2018-039131

(51) Int. Cl.
*H04L 29/08* (2006.01)

(52) U.S. Cl.
CPC .......... *H04L 67/2842* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2011/0320820 A1* | 12/2011 | Wray | .................... H04L 67/142 713/176 |
| 2016/0205147 A1* | 7/2016 | Wu | ..................... H04L 65/1093 709/204 |

OTHER PUBLICATIONS

Ryan Stevens, et al., "Predictive Eviction: A Novel Policy for Optimizing TLS Session Cache Performance", GLOBECOM 2015 (http://web.cs.ucdavis.edu/~hchen/paper/globecom2015.pdf).

* cited by examiner

*Primary Examiner* — Jeffrey R Swearingen
(74) *Attorney, Agent, or Firm* — Mattingly & Malur, PC (57) ABSTRACT

When a cache miss occurs for a connection request from a client, a server calculates predicted next connection time which is the sum of time related to reception of the latest connection request from the client and a connection request period of the client. At least when the cache area is full, the server determines whether to cache, in the cache area, a session information set including a session ID associated with the latest connection request on the basis of the predicted next connection time calculated for the client.

8 Claims, 8 Drawing Sheets

SESSION CACHE DB
211
(MAXIMUM NUMBER OF RECORDS = 5)

| SESSION INFORMATION SET 301 | NODE ID 302 | NEXT PREDICTED CONNECTION TIME (ET) 303 | CONNECTION OVER TIME (OT) 304 |
|---|---|---|---|
| 1 | Node A | ET=110 | OT=200 |
| 2 | Node B | ET=120 | OT=170 |
| 3 | Node C | ET=140 | OT=190 |
| 4 | Node D | ET=150 | OT=180 |
| 5 | Node E | ET=180 | OT=200 |

SERVER FOR CACHING SESSION INFORMATION SET AND METHOD OF CONTROLLING CACHE OF SESSION INFORMATION SET

BACKGROUND OF THE INVENTION

1. Field of the Invention

The present invention relates generally to cache control of session information sets.

2. Description of the Related Art

Transport Layer Security (TLS) is known as one example of technology for making a connection (establishing a state in which data can be transmitted and received) in response to a connection request associated with a session ID (technology called Datagram Transport Layer Security (DTLS) is also known as a variation of TLS (for example, extension). In TLS, in the first session, a full handshake is performed between a client and a server to establish a session.

In TLS, session resumption is supported. When the session is resumed, as compared to a full handshake, the resources (amount of calculation resources required for session establishment (e.g. computation amount such as the CPU usage rate) and traffic (total amount of data transmitted and received between the client and the server for session establishment) can be reduced.

For session resumption, a session information set necessary for a session needs to be cached in the server. In other words, when the cache hit rate of the session information set in the server is high, there is a high probability of session resumption.

Generally, First-In, First-Out (FIFO) is adopted as the caching scheme for session information sets.

As a technology aiming at improving the cache hit rate in the server, a technology disclosed in Ryan Stevens and Hao Chen, "Predictive Eviction: A Novel Policy for Optimizing TLS Session Cache Performance", GLOBECOM 2015 (http://web.cs.ucdavis.edu/-hchen/paper/globecom2015.pdf) is known. According to Ryan Stevens and Hao Chen, "Predictive Eviction: A Novel Policy for Optimizing TLS Session Cache Performance", GLOBECOM 2015 (http://web.cs.ucdavis.edu/-hchen/paper/globecom2015.pdf), a client notifies a server of predicted next connection time which is predicted time when the client connects again, and the server determines whether to cache a session information set of the client on the basis of the predicted next connection time sent from the client.

SUMMARY OF THE INVENTION

Generally, a server has more communication partners than a client has, and thus the number of session information sets to be cached is larger. Especially in the Internet of things (IoT), this is more so since a large number of IoT devices such as sensor devices are the clients.

When the total amount of session information sets is larger than the capacity of a cache area for session information sets in a server, overflowing session information sets are evicted from the cache area. In this case, even when the server receives a session ID in the evicted session information set from the client, session resumption is impossible since a cache miss occurs, thus requiring a full handshake with a large amount of resources and a large amount of traffic. In order to improve the communication efficiency, improvement of the cache hit rate of session information sets is important.

However, with the technology described in Ryan Stevens and Hao Chen, "Predictive Eviction: A Novel Policy for Optimizing TLS Session Cache Performance", GLOBECOM 2015 (http://web.cs.ucdavis.edu/-hchen/paper/globecom2015.pdf), since each client needs to notify the server of a next predicted connection time, the traffic between the clients and the server increases. Moreover, with the technology described in Ryan Stevens and Hao Chen, "Predictive Eviction: A Novel Policy for Optimizing TLS Session Cache Performance", GLOBECOM 2015 (http://web.cs.ucdavis.edu/-hchen/paper/globecom2015.pdf), it is necessary to add, to each client, a function of predicting a next connection time and a function of notifying the predicted time. It is a burden to add such function to each of the clients, which are many as compared to the server. Such a disadvantage particularly matters in the IoT, in which the number of clients tends to be enormous.

On the other hand, in the FIFO that is generally adopted, there is no such disadvantage as the one in the technology described in Ryan Stevens and Hao Chen, "Predictive Eviction: A Novel Policy for Optimizing TLS Session Cache Performance", GLOBECOM 2015 (http://web.cs.ucdavis.edu/-hchen/paper/globecom2015.pdf); however, no improvement in the cache hit rate is expected. For example, for a plurality of clients, each of which is to transmit connection requests at the same interval, in the case where the number of session information sets that can be stored in a cache area is smaller than the number of clients, the cache hit rate equals zero.

The disadvantage as the above is not limited to TLS (or DTLS), but may also apply to other technologies in which connection is made in response to a connection request associated with a session ID.

When a cache miss occurs for a connection request from a client (the case where a session information set including a session ID that matches a session ID associated with the connection request received from the client is not cached in a cache area), a server calculates predicted next connection time which is the sum of time related to reception of the latest connection request from the client and a connection request period of the client. At least when the cache area is full, the server determines whether to cache, in the cache area, a session information set including a session ID associated with the latest connection request on the basis of the predicted next connection time calculated for the client.

Cache control can be performed on the basis of predicted next connection time of clients without requiring each of the clients to notify a server of the predicted next connection time. Since for each of the clients, the predicted next connection time is based on connection request periods, as the actual connections with the client, and cache control is performed on the basis of such predicted time, improvement of the cache hit rate can be expected. In other words, improvement of the cache hit rate can be expected without requiring each of the clients to notify the server of the predicted next connection time.

DESCRIPTION OF THE PREFERRED EMBODIMENTS

In the following description, an "interface unit" may include one or more interfaces. The one or more interfaces may be one or more communication interface devices of the same type (e.g. one or more network interface cards (NIC)) or communication interface devices of two or more different types (e.g. NIC and host bus adapter (HBA)).

In the following description, a "memory unit" includes one or more memories, and may typically be a main storage device. At least one memory in the memory unit may be a volatile memory or a nonvolatile memory.

Moreover, in the following description, a "PDEV unit" includes one or more PDEVs, and may typically be an auxiliary storage device. A "PDEV" stands for a Physical storage DEVice, and typically refers to a nonvolatile storage device, for example, a hard disk drive (HDD) or a solid state drive (SSD).

Note that, in the following description, a "storage unit" is at least one (typically, at least the memory unit) of the memory unit and at least a part of the PDEV unit.

Further, in the following description, an "operation unit" is one or more operation modules. At least one operation module is typically a microprocessor such as a central processing unit (CPU), but may be another type of operation module such as a graphics processing unit (GPU). A processor as the at least one operation module may be have a single core or multiple cores. At least one operation module may be an operation module in a broad sense such as a hardware circuit (e.g. field-programmable gate array (FPGA) or application specific integrated circuit (ASIC)) that performs a part or all of the processing.

In the following description, some pieces of information that allow for output in response to input are expressed as "xxx table." This information may be data of any structure, and may be a learning model such as a neural network that generates output in response to input. Therefore, "xxx table" can be rephrased as "xxx information." In the following description, configurations of tables are merely examples, and one table may be divided into two or more tables, and all or a part of two or more tables may form one table.

In the following description, some functions are expressed as "kkk unit" (excluding the interface unit, the storage unit, and the operation unit). A function may be implemented by execution of one or more computer programs by the operation unit, or may be implemented by one or more hardware circuits (e.g. FPGA or ASIC). In the case where a function is implemented by execution of a program by the operation unit, since predetermined processing is performed using the storage unit, the interface unit, and/or other components as appropriate, the function may be regarded as at least a part of the operation unit. Processing described with a function as a subject may be regarded as processing performed by the operation unit or a device including the operation unit. A program may be installed from a program source. A program source may be, for example, a program-distributing computer or a computer-readable recording medium (e.g. a non-transitory recording medium). Explanations of functions are merely examples, and a plurality of functions may be combined into one, or one function may be divided into multiple functions.

In the following description, an "information set" refers to a set of logical electronic data for a program such as an application program and may be any of a record, a file, a key/value pair, and a tuple, for example.

Moreover, in the following description, the unit of "time" may be year, month, day, hour, minute, and second, or may be more rough or finer, or may be a unit different therefrom.

In some cases in the following description, in the case where the same type of components are described without being distinguished, a common part of symbols is used. In the case where the same type of components are distinguished, symbols are used. For example, when IoT devices are not distinguished from one another, they are referred to as "IoT devices 101," whereas when the IoT devices are distinguished, they are referred to as an "IoT device 101A" or an "IoT device 101B."

An embodiment of the present invention will be described below with reference to drawings. Note that, in the present embodiment, TLS is adopted as one example of technology for making a connection in response to a connection request associated with a session ID; however, the present invention is also applicable to other technologies in which a connection is made in response to a connection request associated with a session ID.

Incidentally, although communication between clients and a server in the IoT is adopted as an example in the present embodiment; however, the present invention is also applicable to communication between other clients and servers.

Figure 1:
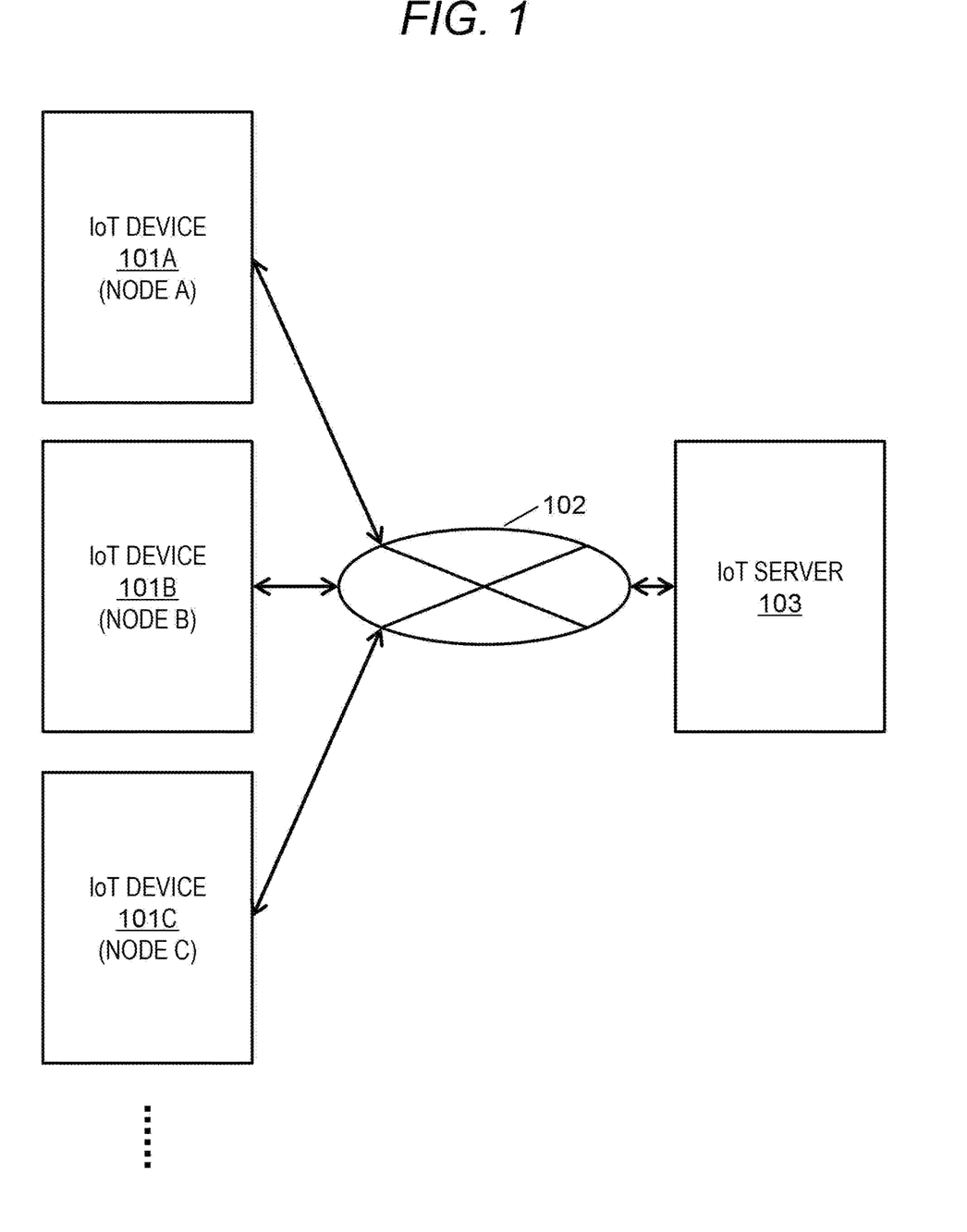
FIG. 1 is a diagram illustrating a configuration of a client-server system according to an embodiment of the present invention.

FIG. 1 is a diagram illustrating a configuration of a client-server system according to an embodiment of the present invention.

Each of a plurality of IoT devices 101 (for example IoT devices 101A to 101C) exists as exemplary clients, and an IoT server 103 exists as an exemplary server. Communication is performed between each of the plurality of IoT devices 101 and the IoT server 103 via a communication network 102 such as a wireless communication network.

Various devices may be adopted as the IoT devices 101. For example, each of the IoT devices 101 may be a sensor device (or another type of device) installed in a factory, and the IoT server 103 may be a server that collects data from each of the IoT devices 101 in the factory.

Note that notations such as "node A" and "node B" in FIG. 1 are node IDs (an example of client IDs) allocated to the IoT devices 101.

Figure 2:
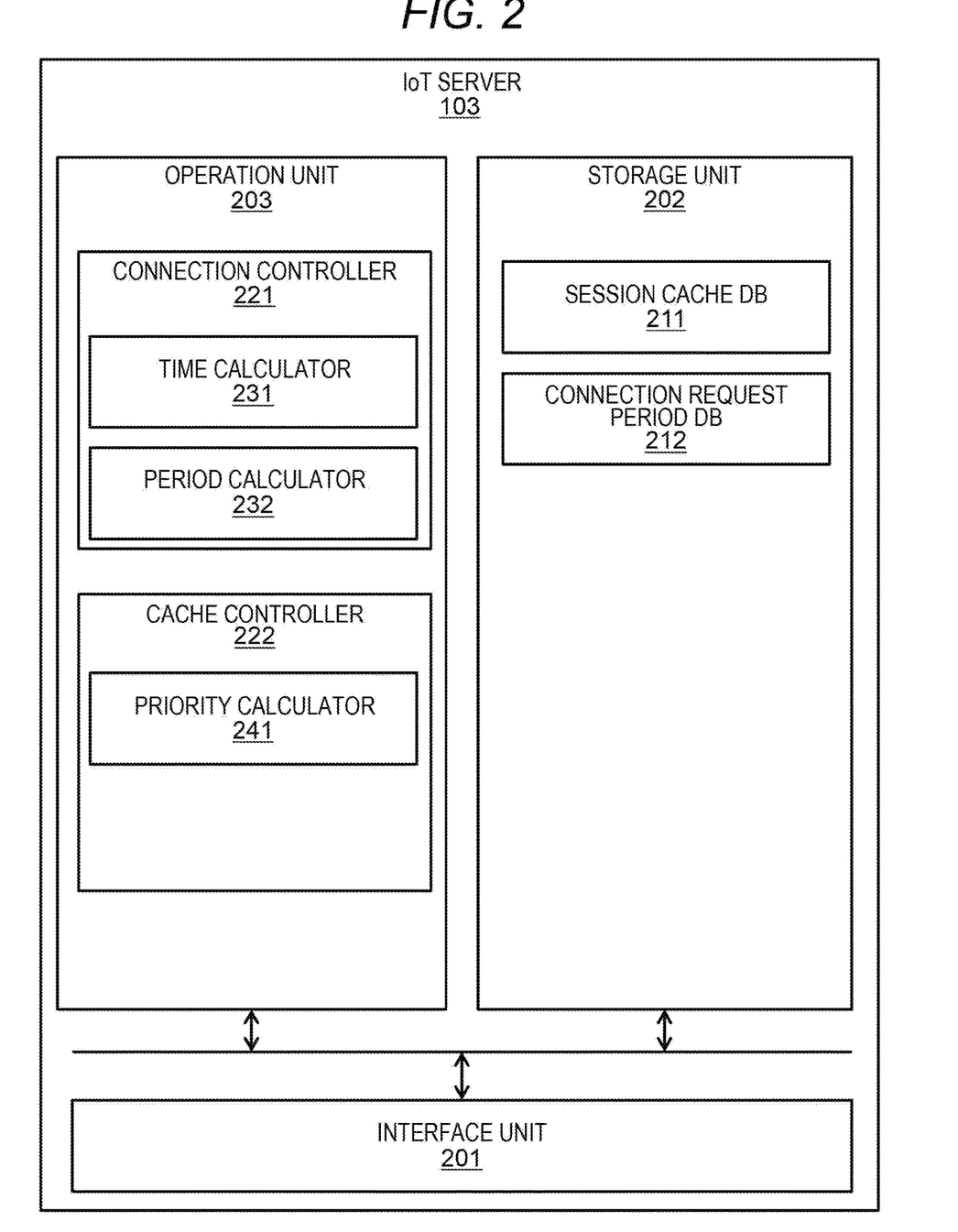
FIG. 2 is a diagram illustrating a configuration of an IoT server.

FIG. 2 is a diagram illustrating a configuration of an IoT server 103.

The IoT server 103 is typically a computer system (one or more computers), and includes an interface unit 201, a storage unit 202, and an operation unit 203 connected thereto.

Communication with each of the IoT devices 101 is performed via the interface unit 201.

The storage unit 202 stores one or more computer programs executed by the operation unit 203 and information to be referred to or updated by the operation unit 203. Examples of such information include a session cache DB (database) 211 and a connection request period DB 212. All or a part of a storage area storing the session cache DB 211 is an exemplary cache area.

Functions such as a connection controller 221 and a cache controller 222 are implemented by the operation unit 203 executing one or more computer programs.

The connection controller 221 controls connection with the IoT devices 101. The connection controller 221 includes a time calculator 231 for calculating predicted next connection time and connection over time and a period calculator 232 for calculating (updating) a connection request period. The terms "predicted next connection time," "connection over time," and "connection request period" will be described later.

The cache controller 222 controls the cache of session information sets. The cache controller 222 includes a priority calculator 241 for calculating (determining) cache priority of session information sets. The terms "session information set" and "cache priority" will be described later.

In the present embodiment, the connection of the IoT devices 101 to the IoT server 103 is performed according to TLS. Note that, for simplicity of description, it is assumed in the present embodiment that, between one IoT device 101 and the IoT server 103, one session is performed.

According to TLS, in the first session, a full handshake is performed. The outline of a full handshake is as the following (F1) to (F4), for example.

(F1) An IoT device 101 transmits a connection request (ClientHello) associated with a random session ID (dummy session ID) to the IoT server 103. To "transmit a connection request associated with a session ID" may be to transmit a connection request including a session ID or to transmit a session ID after transmission of a connection request.

(F2) The IoT server 103 (connection controller 221) returns a response (ServerHello) associated with an official session ID to the IoT device 101. As a result, the session ID is shared between the IoT server 103 and the IoT device 101.

(F3) Mutual authentication processing is performed between the IoT server 103 (connection controller 221) and the IoT device 101.

(F4) Communication is performed between the IoT server 103 (connection controller 221) and the IoT device 101 for sharing a common key for encrypted communication.

On the other hand, according to TSL, an IoT device 101 transmits a connection request associated with an official session ID to the IoT server 103. If there is a cache hit, which is a state where a session information set including a session ID that matches the session ID is cached in the IoT server 103, a session is resumed. In session resumption, a part of the mutual authentication processing and the communication for sharing a common key performed in the full handshake are omitted. That is, a handshake necessary for session establishment is simplified.

In the present embodiment, when a cache miss occurs for a connection request from an IoT device 101, the connection controller 221 calculates predicted next connection time which is the sum of time related to reception of the latest connection request from the IoT device 101 and a connection request period of the IoT device 101. At least when the cache area is full, the cache controller 222 determines whether to cache, in the cache area, a session information set including a session ID associated with the latest connection request from the IoT device 101 on the basis of the predicted next connection time calculated for the IoT device 101. As a result of this, improvement of the cache hit rate can be expected without requiring each of the IoT devices 101 to notify the IoT server 103 of the predicted next connection time.

Note that the "time related to reception of the connection request" may be the current time when the connection request has been received, the time when the cache area has been accessed for determination of whether there is a cache hit, the current time when an access related to session termination has been received, or the time indicated by a timestamp embedded in the connection request.

In addition, "the cache area is full" refers to a state where the total volume of all the cached session information sets has reached the capacity upper limit (e.g. the capacity of the cache area, or a predetermined percentage thereof). The "total volume" may be the number of cached session information sets, and likewise the "capacity upper limit" may be the maximum value of the number of session information sets that can be cached in the cache area.

Hereinafter, the present embodiment will be described in detail.

Figure 3:
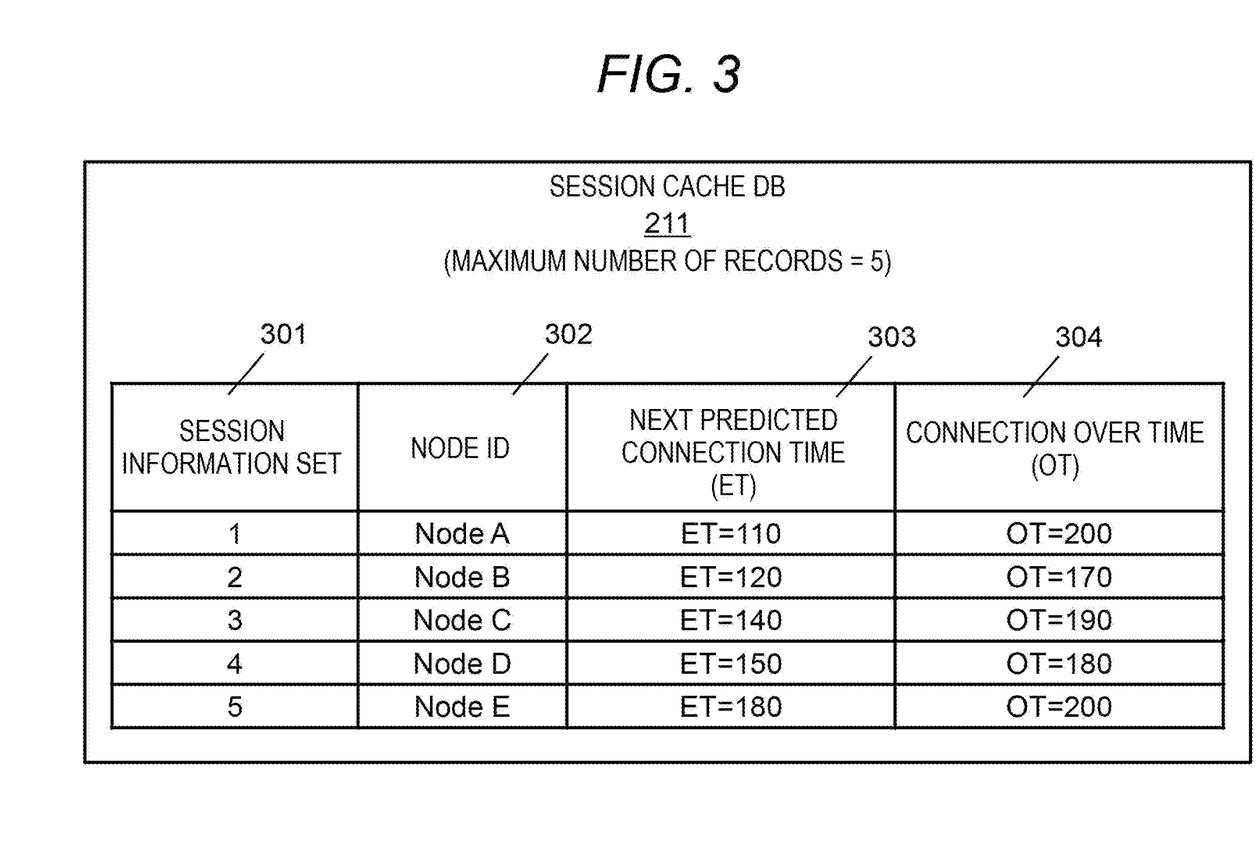
FIG. 3 is a diagram illustrating a configuration of a session cache DB.

FIG. 3 is a diagram illustrating a configuration of the session cache DB 211.

The session cache DB 211 is a DB of session information sets. The session cache DB 211 has a record for each session. Each record stores information such as session information sets 301, node IDs 302, predicted next connection time 303, and connection over time 304. Hereinafter, one session will be taken as an example (referred to as a "target session" in the description of FIG. 3).

A session information set 301 is a session information set of a target session. A node ID 302 indicates a node ID of an IoT device 101 corresponding to the target session. The predicted next connection time 303 indicates predicted time related to reception of the next connection request (request to resume a session) corresponding to the target session. The connection over time 304 indicates the maximum time (the farthest future time allowed) allowed for the session information set corresponding to the target session to be cached without reception of a next connection request. The connection over time 304 is the sum of predicted next connection time of the target session and allowable delay time for the client corresponding to the target session (that is, time obtained by adding the allowable delay time to the predicted next connection time). Both the connection over time and the predicted next connection time are calculated by the time calculator 231. The "allowable delay time" refers to time that is allowed for reception of a connection request to be delayed from predicted next connection time.

In this manner, each of the session information sets 301 cached in the cache area is associated with predicted next connection time 303 calculated for the session information set 301. This allows predicted next connection time calculated with respect to a cache miss to be compared to predicted next connection time 303 of each of the session information sets 301 cached in the cache area, whereby whether to cache a new session information set related to the cache miss can be determined.

As described above, the cache area is all or a part of the storage area for storing the session cache DB 211. Out of the session information sets 301, the node IDs 302, the predicted next connection time 303, and the connection over time 304, at least the session information sets 301 may be stored in the cache area. In other words, each record included in the session cache DB 211 may be a logical record. For example, a part of a record may be on the memory unit as the main storage device and the rest of the record may be on the PDEV unit as the auxiliary storage device.

As an example of the capacity upper limit of the cache area, the maximum value of the number of session information sets that can be stored in the session cache DB 211 is specified. Specifically, for example, as in the example illustrated in FIG. 3, the maximum number of records included in the session cache DB 211 is five.

Note that a "session information set" may include information referred to at the time of communication (e.g. information indicating an encryption scheme or information referred to in mutual authentication processing) in addition to a session ID. In FIG. 3, only session IDs are illustrated in the session information sets 301. A session information set may further include a client ID (e.g. a hash value of a client certificate).

Access to the session cache DB 211 is performed by the cache controller 222. For example, the cache controller 222 searches in the cache area with a session ID from an IoT device 101 using as a key to read a hit session information set. In addition to the session ID, a client ID of the IoT device 101 may also be used as the key. Moreover, for example, the cache controller 222 can add (insert) a record including a session information set 301, a node ID 302, predicted next connection time 303, and connection over time 304 to the session cache DB 211. That is, the cache controller 222 can cache a new session information set. Furthermore, for example, the cache controller 222 can evict a record (session information set) from the session cache DB 211 (cache area). Addition or eviction of a session information set may be based on the cache priority. The cache priority is determined by the priority calculator 241. The cache controller 222 can also sort the records by using either the predicted next connection time 303 or the connection over time 304 as a key.

Figure 4:
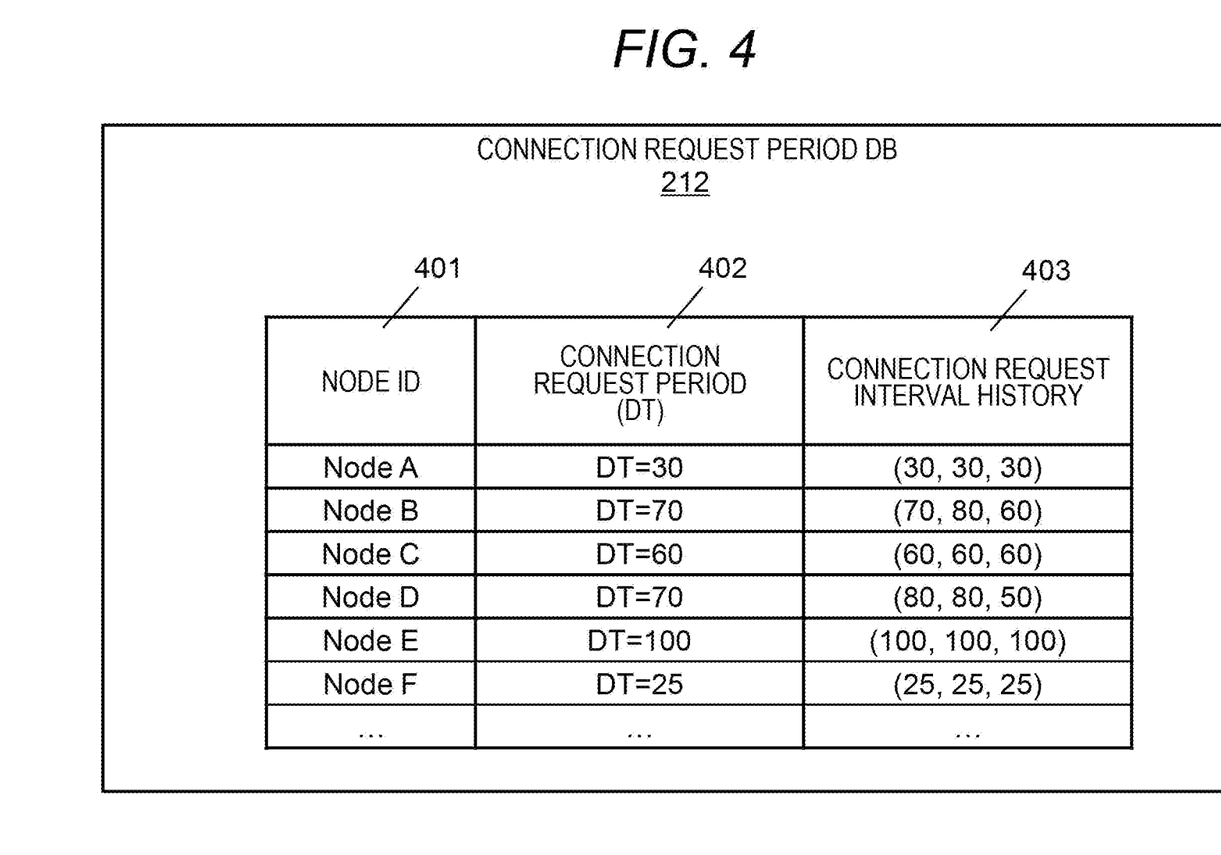
FIG. 4 is a diagram illustrating a configuration of a connection request period DB.

FIG. 4 is a diagram illustrating a configuration of the connection request period DB 212.

The connection request period DB 212 is a DB of connection request periods. The connection request period DB 212 has a record for each of the IoT devices 101. Each record stores information such as a node ID 401, a connection request period 402, and a connection request interval history 403. Hereinafter, one IoT device 101 will be taken as an example (referred to as a "target IoT device 101" in the description of FIG. 4).

A node ID 401 indicates a node ID of a target IoT device 101. A connection request period 402 indicates a connection request period of the target IoT device 101. The connection request periods are calculated by the period calculator 232. A connection request interval history 403 indicates the history of connection request intervals (reception intervals of connection requests) (e.g. the latest N connection request intervals (N=3 in FIG. 4)).

Each record included in the connection request period DB 212 may be a logical record. For example, a part of a record may be on the memory unit as the main storage device and the rest of the record may be on the PDEV unit as the auxiliary storage device.

For each of the IoT devices 101, the period calculator 232 in the connection controller 221 refers to a connection request interval history 403 of each of the IoT devices 101 and updates the connection request period of the IoT device 101 on the basis of a plurality of connection request intervals including the latest connection request interval (interval between time related to reception of the latest connection request and time related to reception of the preceding connection request) of the IoT device 101. As a result, as the connection request period, it is expected that an appropriate connection request period cane obtained. Therefore, improvement in the appropriateness of the predicted next connection time referred to at the time of cache control can be expected. The update of the connection request period may be performed at any timing upon processing of a connection request (e.g. when an access related to session termination is received). A "connection request period" is a value (e.g. an average value, the maximum value, or the minimum value) based on a plurality of connection request intervals.

A node ID is an ID obtained in a session according to TLS (for example, mutual authentication processing in a full handshake), which allows an IoT device 101 to be uniquely identified. By using (efficiently utilizing) such a node ID that is naturally obtained, the correspondence relationship between an IoT device 101 and a connection request period (and the connection request interval history) can be accurately maintained. Note that a node ID may be, for example, a hash value of a client certificate obtained from an IoT device 101.

Figure 5:
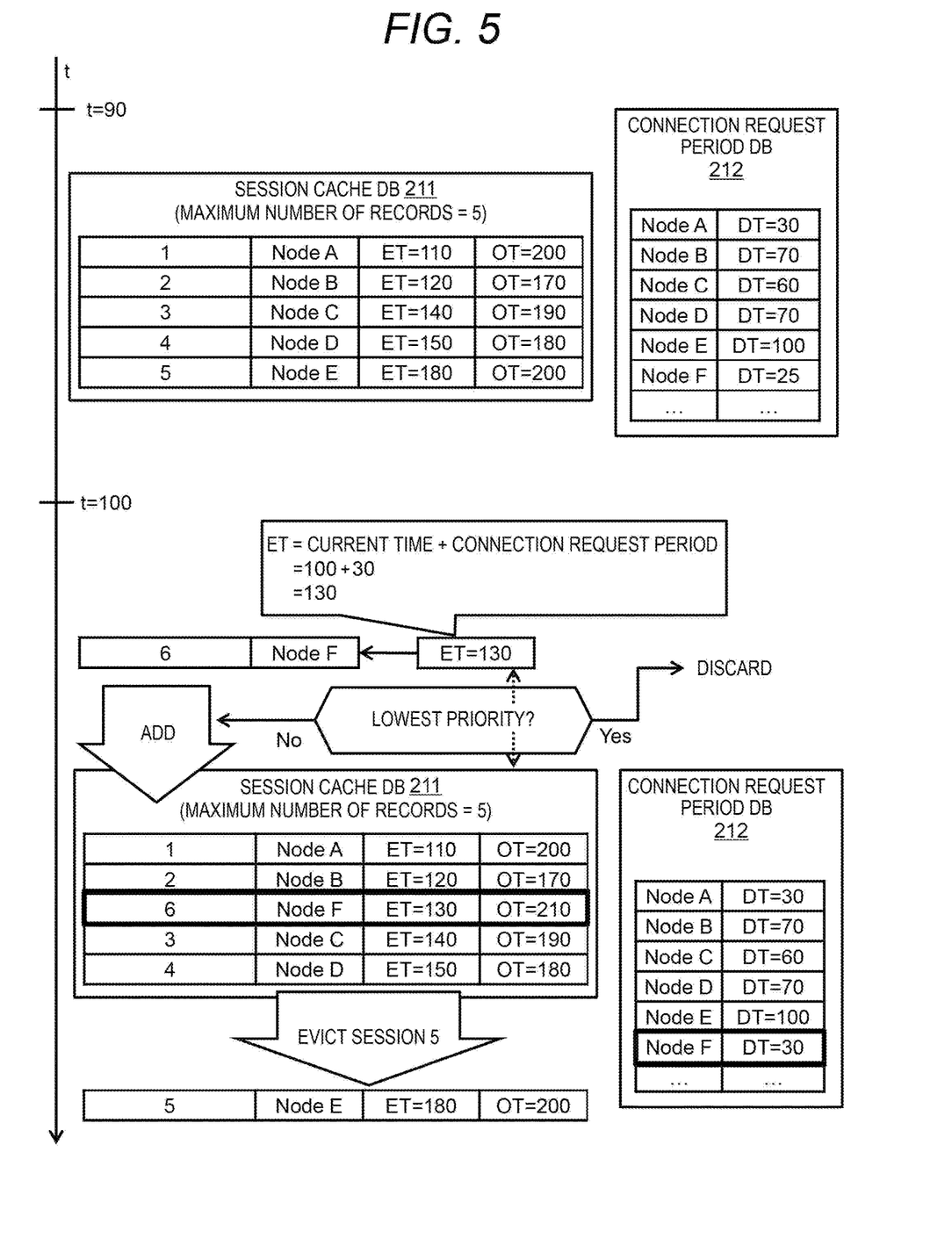
FIG. 5 is a diagram illustrating an overview of cache control performed in an embodiment of the present invention.

FIG. 5 is a diagram illustrating an overview of cache control performed in the present embodiment. Note that, in the following description, "session n" (n is a natural number) means a session where session ID=n. In addition, in the description of FIG. 5, an IoT device 101 will be referred to by using a node ID for the sake of convenience. Specifically, for example, "node A" refers to the IoT device 101A (see FIG. 1).

For example, it is assumed that the cache area is full at time t=90. For example, the session cache DB 211 stores five session information sets (five records), each corresponding to sessions 1 to 5. Sessions 1 to 5 correspond to nodes A to E, respectively.

Then, at time t=100, let us assume that session 6 has occurred from node F. Since the session information set of session 6 is not cached (because there is no record corresponding to session 6 in the session cache DB 211), a cache miss occurs.

In this case, the time calculator 231 calculates predicted next connection time corresponding to session 6 for the node F. Here, for example, the predicted next connection time of session 6 is the sum of the current time and a connection interval period of the node F. The "current time" referred to in this paragraph is an example of time related to reception of the connection request of session 6, and is, for example, cache access time related to session 6 (for example, time of accessing the session cache DB 211 for determination as to whether there is a cache hit for session 6). In addition, the "connection interval period" referred to in this paragraph is the latest period updated on the basis of recent connection request intervals and the connection request interval history of the node F (in the example of FIG. 5, this period is updated from "25" to "30").

At least when the cache area is full, the priority calculator 241 calculates the cache priority of the session information set of session 6 and cache priority of each of the session information sets cached in the cache area (session information set of each of sessions 1 to 5). The cache controller 222 determines whether to cache the session information set of session 6 in the cache area on the basis of the above cache priority. The cache priority of each session information set is based on predicted next connection time associated with the session information set. In the absence of connection over time, synonymy is that the cache priority is high and that predicted next connection time is close to the current time. In other words, calculation of the cache priority and acquisition of predicted next connection time are synonymous. Depending on the level of the cache priority, whether to cache the session information set of session 6 and which session information set to evict from the session cache DB 211 for the session information set of session 6 to be cached can be determined. For example, the cache controller 222 determines whether the cache priority of the session information set of session 6 is lower than the cache priority of any session information set cached in the cache area (lowest priority determination). If the result of the determination is false, the cache controller 222 evicts, from the cache area, a session information set having the lowest cache priority among the session information sets cached in the cache area (according to the example of FIG. 5, the session information set of session 5 having the predicted next connection time farthest from the current time t=100). The cache controller 222 caches (adds) the session information set of session 6.

On the other hand, when the result of the lowest priority determination is true, the cache controller 222 discards the session information set of session 6 (alternatively, terminates generation of the session information set of session 6 without completing it).

Note that the cache priority of each session information set calculated by the priority calculator 241 may be based on the connection over time associated with the session information set in addition to the predicted next connection time associated with the session information set. For each session information set, connection over time is calculated by the time calculator 231. For example, the connection over time is the sum of the predicted next connection time associated with the session information set of session 6 and allowable delay time associated with the node F corresponding to the session information set. As a result, appropriate cache priority can be expected, whereby a session information set remains in the cache area unused, and as a result, an improvement in the cache hit rate can be expected.

Allowable delay time for at least one IoT device 101 (node) may be different from allowable delay time for any one of other IoT devices 101. As a result of this, appropriate connection over time can be expected depending on the type or other features of the IoT devices 101, and thus improvement of the cache hit rate can be expected.

Allowable delay time for each of the IoT devices 101 may be based on at least one of a connection request period corresponding to the IoT device 101 and a connection request interval history of the IoT device 101. As a result of this, connection over time can be expected to be appropriate for the situation of connection request intervals the IoT device 101, and thus improvement of the cache hit rate can be expected.

In addition, the following relationships (R1) to (R3) may be adopted as the relationship of cache priority. According to (R1), a session information set, remaining unused in the cache area even after the connection over time has passed, can be preferentially evicted from the cache area. According to (R2), from among session information sets, remaining unused in the cache area even after the connection over time has passed, a session information set which has not been used for the longest time can be preferentially evicted from the cache area. According to (R3), from among session information sets which may be used in the near future since the connection over time has not been reached, a session information set, which is predicted to be used the latest, can be preferentially evicted from the cache area.

(R1) The cache priority of a session information set, connection over time of which is older than the current time, is lower than the cache priority of a session information set, connection over time of which is the current time or future time.

(R2) Among session information sets, connection over time of which is older than the current time, as the connection over time is farther from the current time, the lower the cache priority is.

(R3) Among session information sets, connection over time of which is the current time or future time, as the predicted next connection time is farther from the current time, the lower the cache priority is.

Exemplary processing performed in the present embodiment will be described below.

Figure 6:
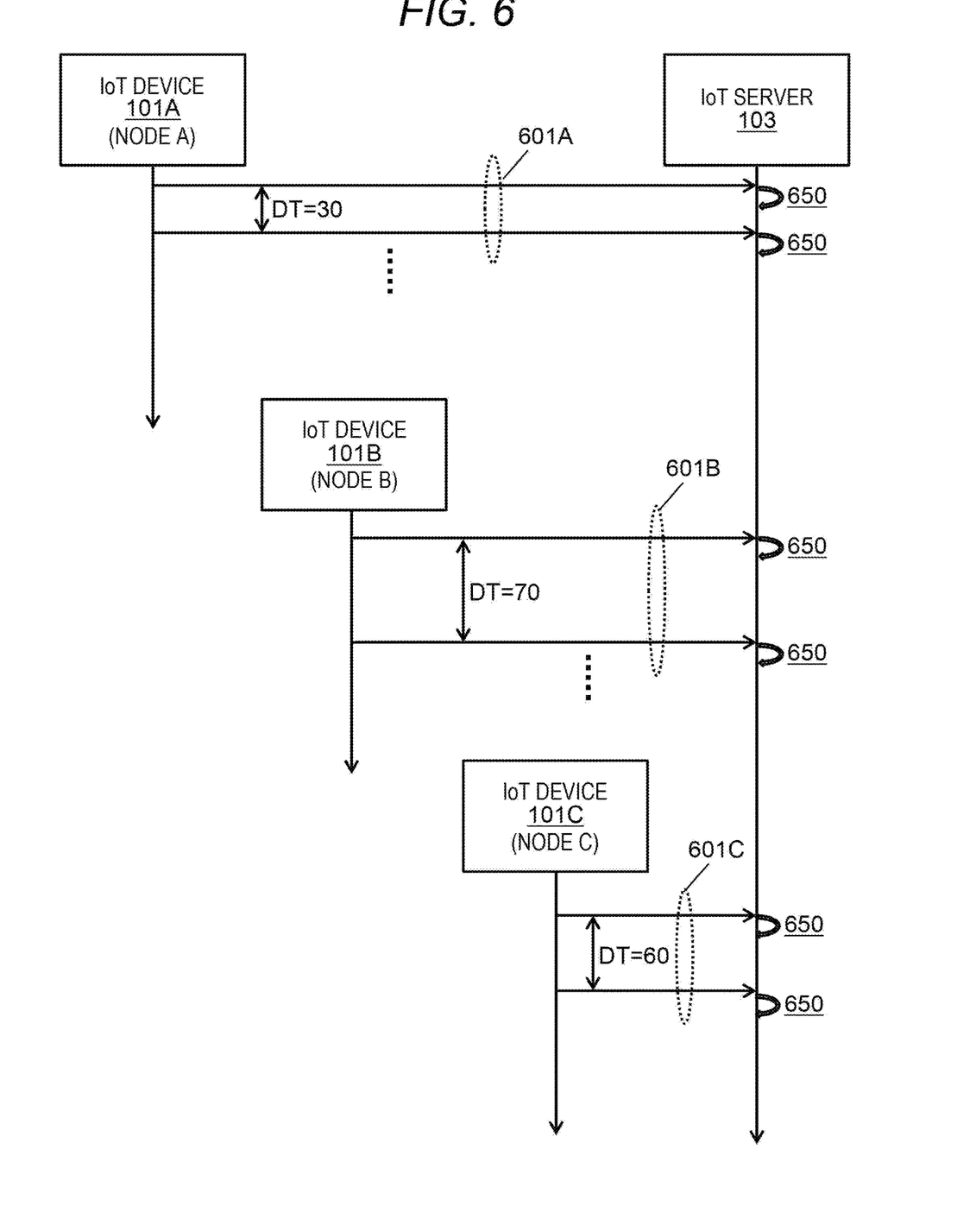
FIG. 6 is a diagram illustrating a flow of processing between IoT devices and the IoT server.

FIG. 6 is a diagram illustrating a flow of processing between the IoT devices 101 and the IoT server 103.

For example, each of the IoT devices 101A to 101C issues a connection request at the connection request periods exemplified in FIG. 4. Specifically, for example, the IoT device 101A transmits a connection request to the IoT server 103 at a connection request period of "30" (601A). The IoT device 101B transmits a connection request to the IoT server 103 at a connection request period of "70" (601B). The IoT device 101C transmits a connection request to the IoT server 103 at a connection request period of "60" (601C).

The IoT server 103 performs a series of processing (650) including connection control and cache control every time a connection request is received.

Figure 7:
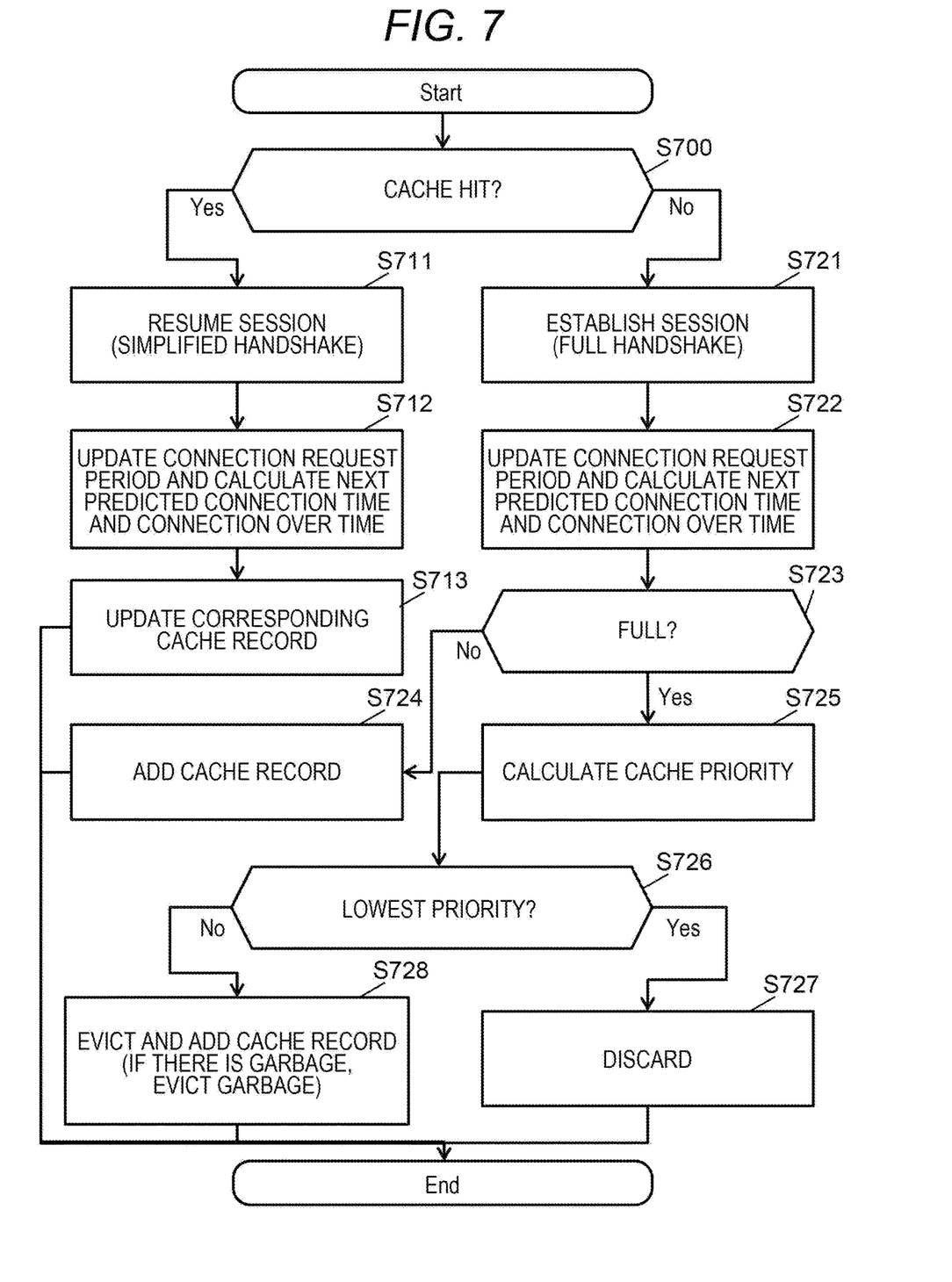
FIG. 7 is a diagram illustrating a flow of a series of processing performed by the IoT server that has received a connection request.

FIG. 7 is a diagram illustrating a flow of the series of processing performed by the IoT server 103 that has received a connection request. Hereinafter, in the description of FIG. 7, the received connection request is referred to as the "target connection request," a session corresponding to the session ID associated with the target connection request is referred to as the "target session," a session information set of the target session is referred to as the "target session information set," and an IoT device 101 as the transmission source of the target connection request is referred to as the "target node."

The cache controller 222 determines whether there is a cache hit, which is a state where a target session information set exists in the session cache DB 211 (S700).

If the determination result of S700 is true (S700: Yes), that is, if there is a cache hit, the following processing is performed. The connection controller 221 performs processing of session resumption using the hit target session information set (S711). In this processing, only a simplified handshake is required. In S712, the period calculator 232 updates the connection request period of the target node on the basis of the latest connection request interval. Furthermore in S712, the time calculator 231 calculates predicted next connection time of the target session from the current time (e.g. the time at S700) and the connection request period, and calculates connection over time from the predicted next connection time and allowable delay time of the target node. The cache controller 222 updates the cache record (record in the session cache DB 211) corresponding to the target session (S713). Specifically, the cache controller 222 updates the predicted next connection time 303 and the connection over time 304 associated with the cached target session information to the predicted next connection time and the connection over time calculated in S712.

When the determination result of S700 is false (S700: No), that is, if a cache miss occurs, the following processing is performed. That is, the connection controller 221 performs session establishment processing (S721). In this processing, a full handshake is performed. In S722, the same processing as S712 is performed. The cache controller 222 determines whether the cache area is full (S723). If the determination result in S723 is false (S723: No), the cache controller 222 adds a cache record including the target session information set to the session cache DB 211 (caches the target session information set) (S724). On the other hand, if the determination result in S723 is true (S723: Yes), the cache controller 222 calculates the cache priority of the target session information set and the cache priority of each of the cached session information sets (S725). The cache controller 222 determines whether the cache priority of the target session information set is the lower than the cache priority of any of the cached session information sets (S726). If the determination result of S726 is true (S726: Yes), the cache controller 222 discards the target session information set (S727). If the determination result of S726 is false (S726: No), the cache controller 222 evicts the cache record including the session information set having the lowest cache priority from the session cache DB 211, and adds the cache record including the target session information set to the session cache DB 211 (S728).

Incidentally, at any timing during S700 to S728 (e.g. S728), the cache controller 222 may evict garbage from the session cache DB 211 if there is any. The "garbage" referred to here is a cache record including a session information set, connection over time of which is older than the current time. When the garbage is evicted, a new session information set can be cached, and thus as a result, improvement in the cache hit rate can be expected.

Figure 8:
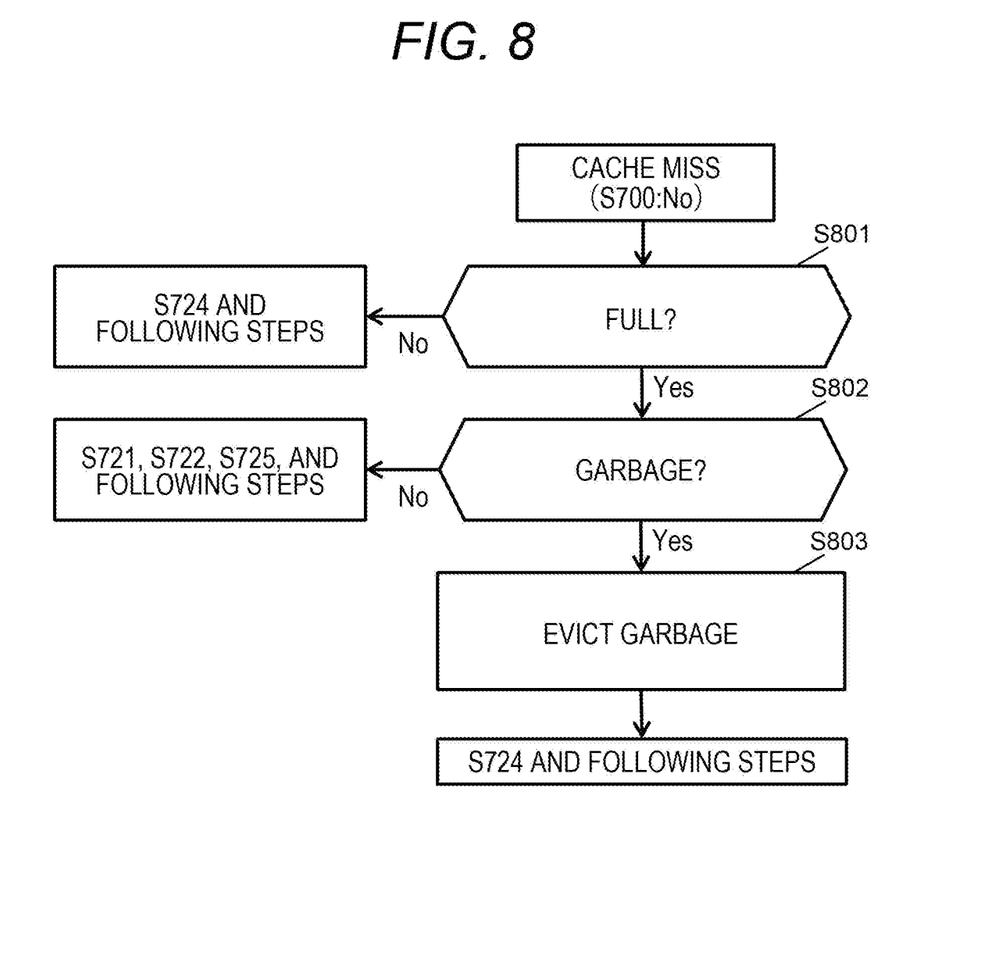
FIG. 8 is a diagram illustrating a part of a variation of a series of processing performed by the IoT server that has received a connection request.

FIG. 8 is a diagram illustrating a part related to a variation of a series of processing performed by the IoT server 103 that received the connection request. In this variation, the connection over time may not be considered in the cache priority.

For example, in the case of S700: No, the cache controller 222 determines whether the cache area is full (S801). If the determination result in S801 is false (S801: No), the processing of S724 and the following processing are performed.

If the determination result in S801 is true (S801: Yes), the cache controller 222 determines whether there is garbage, that is, whether there is a cache record including a session information set, connection over time of which is older than the current time, in the session cache DB 211 (S802). If the determination result in S802 is true (S802: Yes), the cache controller 222 evicts at least one piece of garbage from the session cache DB 211. As a result, whether there is garbage is determined upon cache access for determination as to whether there is a cache hit. That is, garbage eviction is efficiently performed.

If the determination result in S802 is false (S802: No), since the cache area is full, S721, S722, and S725 and the following processing are performed.

Note that S802 and S803 may be performed asynchronously (e.g. periodically) with the series of processing performed when a connection request is received; however, by performing these steps in the series of processing performed upon reception of a connection request as in the embodiment and the variation described above, the garbage can be evicted efficiently.

Although one embodiment and one variation have been described above, these are merely examples for explaining the present invention, and the scope of the present invention is not limited only to this embodiment or the variation. The present invention may be implemented in various other embodiments. For example, in the embodiment, in order to simplify the explanation, the correspondence between the IoT devices 101 and the session IDs is 1:1 (it is assumed that one session is performed between one IoT device 101 and the IoT server 103); however, the correspondence between the IoT devices 101 and the session IDs may be 1:multiple. In the storage unit of the IoT server 103, at least one of a session ID, a connection request period, a connection request interval history, and allowable delay time may be managed for each session and for each of the IoT devices 101. For example, a connection request period added to predicted next connection time for a certain session of a certain client may be the connection request period corresponding to the certain session of the certain client.

What is claimed is:

1. A server that resumes a session using a cached session information set when a connection request associated with a session ID is received from any one of clients, the server resuming the session in a case where there is a cache hit, which is a state where a session information set including a session ID that matches the associated session ID is cached in a cache area, the server comprising:
  a connection controller that calculates predicted next connection time which is a sum of time related to reception of the connection request and a connection request period of the client; and
  a cache controller that determines, at least when the cache area is full, whether to cache a target session information set in the cache area, the target session information set being the session information set including the session ID associated with the connection request, on the basis of the predicted next connection time calculated for the client.

2. The server according to claim 1, wherein the connection controller updates the connection request period of the client on the basis of a plurality of connection request intervals including a latest reception interval of connection requests from the client.

3. The server according to claim 1, wherein the cache controller determines whether to cache the target session information set in the cache area on the basis of cache priority of the target session information set and cache priority of each of all session information sets cached in the cache area, and the cache priority of each of the session information sets is based on predicted next connection time associated with the session information set.

4. The server according to claim 3, wherein when the cache priority of the target session information set is higher than cache priority of at least one of the session information sets cached in the cache area, the cache controller evicts, from the cache area, a session information set having a lowest cache priority among the session information sets cached in the cache area.

5. The server according to claim 1, wherein each of the session information sets cached in the cache area is associated with predicted next connection time calculated for the session information set.

6. The server according to claim 3, wherein the cache priority of each of the session information sets is also based on connection over time associated with the session information set, in addition to the predicted next connection time associated with the session information set, and for each of the session information sets, connection over time is a sum of predicted next connection time associated with the session information set and allowable delay time associated with a client corresponding to the session information set.

7. The server according to claim 6, wherein cache priority of a session information set, connection over time of which is older than a current time, is lower than cache priority of a session information set, connection over time of which is the current time or future time, among session information sets, connection over time of which is older than the current time, as the connection over time is farther from the current time, the lower cache priority is, and among session information sets, connection over time of which is the current time or future time, as predicted next connection time is farther from the current time, the lower cache priority is.

8. The server according to claim 1, wherein each of client IDs of one or more clients is associated with at least one of a connection request period of the client and a connection request interval history which is a basis thereof, and for each of the one or more clients, a client ID of the client is a client ID obtained in a session for connection with the client.

* * * * *